United States Patent
Freudenberg et al.

(10) Patent No.: US 6,441,535 B2
(45) Date of Patent: Aug. 27, 2002

(54) METHOD AND APPARATUS FOR DRIVING AT LEAST ONE CAPACITIVE CONTROL ELEMENT

(75) Inventors: Hellmut Freudenberg, Grossberg; Hartmut Gerken, Nittendorf; Martin Hecker, Laimerstadt; Christian Hoffmann; Richard Pirkl, both of Regensburg; Günther Riedel, Nürnberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/761,598

(22) Filed: Jan. 16, 2001

Related U.S. Application Data

(63) Continuation of application No. PCT/DE99/02056, filed on Jul. 2, 1999.

(30) Foreign Application Priority Data

Jul. 14, 1998 (DE) .......................... 198 31 599

(51) Int. Cl.$^7$ ............................................. H01L 41/09
(52) U.S. Cl. .................................. 310/316.03; 310/317
(58) Field of Search ............................. 310/317, 316.03

(56) References Cited

U.S. PATENT DOCUMENTS

| | | | | |
|---|---|---|---|---|
| 2,963,680 A | * | 12/1960 | Beebe | 310/317 |
| 4,520,289 A | * | 5/1985 | Sato et al. | 310/316.01 |
| 5,204,576 A | * | 4/1993 | Mitsuyasu | 310/317 |
| 5,691,592 A | | 11/1997 | Gunderson et al. | 310/317 |
| 6,016,040 A | * | 1/2000 | Hoffmann et al. | 310/317 |
| 6,060,814 A | * | 5/2000 | Hoffmann et al. | 310/316.03 |
| 6,081,062 A | * | 6/2000 | Hoffmann et al. | 310/316.03 |
| 6,121,715 A | * | 9/2000 | Hoffmann et al. | 310/316.03 |
| 6,133,714 A | * | 10/2000 | Hoffmann et al. | 310/317 |
| 6,198,199 B1 | * | 3/2001 | Hoffmann et al. | 310/316.03 |
| 6,236,190 B1 | * | 4/2001 | Hoffmann et al. | 310/317 |

FOREIGN PATENT DOCUMENTS

| | | | |
|---|---|---|---|
| DE | 196 32 837 A1 | 2/1998 | F02D/41/20 |
| DE | 196 52 809 C1 | 6/1998 | H04N/2/00 |
| DE | 196 32 871 C2 | 7/1998 | F02D/41/20 |

\* cited by examiner

*Primary Examiner*—Thomas M. Dougherty
(74) *Attorney, Agent, or Firm*—Laurence A. Greenberg; Werner H. Stemer; Ralph E. Locher

(57) ABSTRACT

A control element, in particular a piezoelectrically operated fuel injection valve in an internal combustion engine, is charged, in order to compensate for stochastic reactions in the internal combustion engine, with a constant nominal voltage applied to a series circuit that includes a charge capacitor and a charge reversal capacitor, and it is discharged into the charge reversal capacitor to a prescribed voltage value. The remaining residual charge of the control element is charged into the charge capacitor via a limiter path.

10 Claims, 2 Drawing Sheets

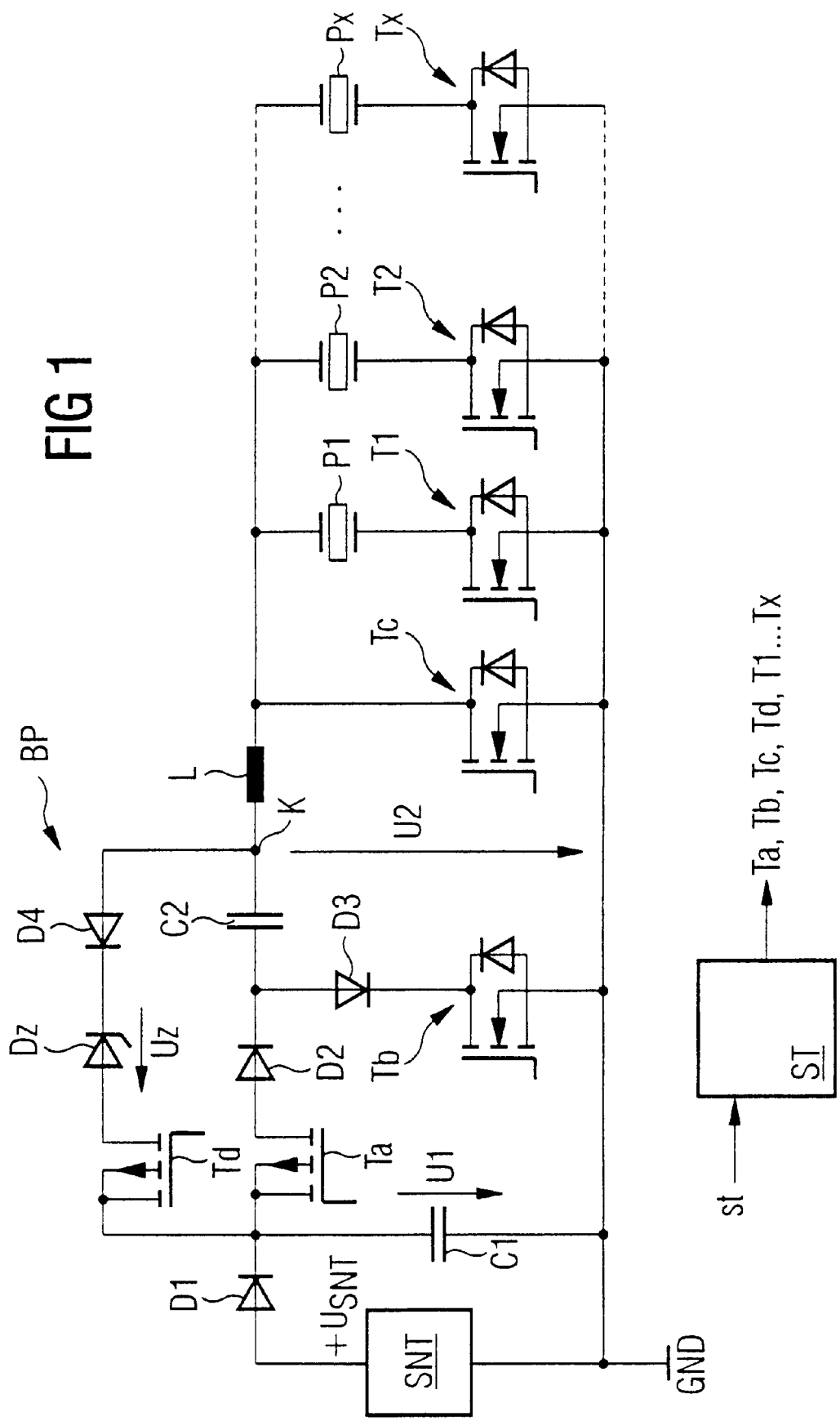

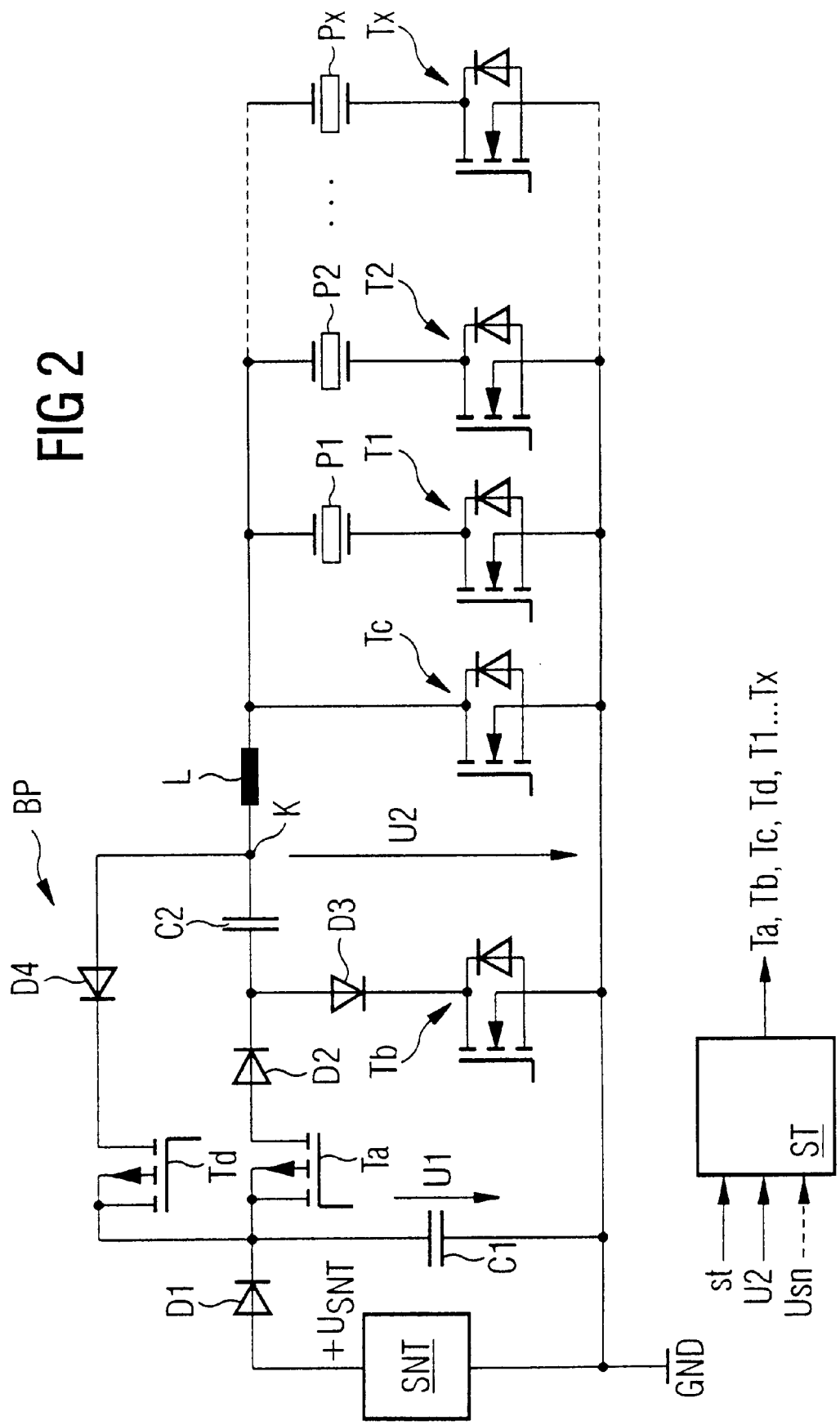

METHOD AND APPARATUS FOR DRIVING AT LEAST ONE CAPACITIVE CONTROL ELEMENT

CROSS-REFERENCE TO RELATED APPLICATION

This application is a continuation of copending International Application No. PCT/DE99/02056, filed Jul. 2, 1999, which designated the United States.

BACKGROUND OF THE INVENTION

Field of the Invention

The invention relates to a method for driving at least one capacitive control element, in particular a piezoelectric control element for a fuel injection valve in an internal combustion engine. In the process, the capacitive control element is driven using a control circuit. The control element is charged with a nominal voltage applied to a series circuit comprising a charge capacitor and a charge reversal capacitor and is discharged into the charge reversal capacitor, which is charged to a prescribed voltage value in the process. The invention also relates to an apparatus for carrying out this method.

U.S. Pat. No. 5,691,592 discloses an apparatus for driving at least one piezoelectric control element in which the control element is charged from a series circuit comprising a charge capacitor, which is charged to a nominal voltage using a voltage source, and a charge reversal capacitor and is subsequently discharged into the charge reversal capacitor. As soon as the charge reversal capacitor has reached a prescribed voltage, the residual charge of the control element is nullified by means of a shunt regulator.

German published patent application DE 196 32 837 A1 discloses a method and an apparatus for driving at least one piezoelectric control element for a fuel injection valve in an internal combustion engine. There, the control element is charged from a series circuit comprising a charge capacitor, which is charged to a nominal voltage using a regulatable voltage source, and a charge reversal capacitor and is subsequently discharged into the charge reversal capacitor. The charge capacitor is subsequently recharged such that the voltage on the series circuit comprising the charge capacitor and the charge reversal capacitor is equivalent to the nominal voltage.

German patent DE 196 32 871 C2 discloses a method and an apparatus for driving at least one piezoelectric control element for a fuel injection valve in an internal combustion engine. There, the control element is charged from a series circuit comprising a charge capacitor, which is charged to a nominal voltage using a regulatable voltage source, and a charge reversal capacitor and is subsequently discharged into the parallel circuit comprising the charge capacitor and the charge reversal capacitor. The charge capacitor is subsequently recharged such that the voltage on the series circuit comprising the charge capacitor and the charge reversal capacitor is equivalent to the nominal voltage.

The two latest-mentioned methods work in internal combustion engines only in the steady-state, settled condition for a particular operating point of the circuit, without any stochastic reaction of the control element on the drive circuit, caused by dynamic state changes in the internal combustion engine or in a motor vehicle driven by the latter, such as:

rotational speed fluctuations upon starting and switching off and when the internal combustion engine changes from and to idling;

changing from overrun operation to regular operation, and vice versa;

when the interval between preliminary injection and main injection is varied;

during stochastic post-injections; and when the charge fed back from the control element into the charge reversal capacitor is varied.

The reactions resulting from such dynamic state changes affect the voltage on the charge reversal capacitor (that voltage is also dependent on the control element capacitance, the engine speed, the fuel pressure, etc.) during charge reversal and causes changes in the charge reversal capacitor, in particular increases in the level of the charge energy and hence of the voltage across the charge reversal capacitor.

As a result of this, the voltage across the charge capacitor must also change, in particular be reduced, in order to be able to follow these dynamic changes and in order to keep the aggregate voltage across the charge capacitor and the charge reversal capacitor constant for the next time the control element is driven; this is not possible as quickly as would be necessary, however. Reducing the voltage across the charge capacitor by limiting the voltage source would take too long. Rapid discharge of the charge capacitor could be achieved only with additional outlay on a plurality of switches (which would also result in additional power loss) and on complex driving software.

SUMMARY OF THE INVENTION

The object of the present invention is to provide a method and apparatus for driving a capacitive actuator which overcomes the above-noted deficiencies and disadvantages of the prior art devices and methods of this general kind, such that the prior apparatus a method are improved the known apparatus and the method to the extent that they are able to compensate for the described reactions of the control element on the drive circuit during dynamic state changes.

With the above and other objects in view there is provided, in accordance with the invention, a method of driving at least one capacitive control element with a control circuit. In a preferred mode, the control element is a piezoelectrically operated fuel injection valve in an internal combustion engine. The method comprises:

providing a series circuit of a charge capacitor and a charge reversal capacitor, the charge capacitor having a capacitance substantially greater than a capacitance of the charge reversal capacitor;

selectively charging a capacitive control element with a nominal voltage applied to the series circuit of the charge capacitor and the charge reversal capacitor, and discharging the control element into the charge reversal capacitor, and thereby charging the charge reversal capacitor to a prescribed voltage value; and when the charge reversal capacitor has reached the prescribed voltage value, charging a remaining residual charge of the control element into the charge capacitor.

This object is achieved in accordance with the features of patent claim 1 by virtue of the fact that the charge reversal capacitor (C2) has much smaller dimensions than the charge capacitor C1 (C2<<C1) and, when the control element is discharged, charging is carried out only up to a prescribable voltage value, and that the excess residual charge of the control element is discharged into the charge capacitor C1, on which it produces only an insignificant, negligible voltage swing on account of the capacitance ratio C1>>C2 between the charge capacitor and the charge reversal capacitor. In this manner, reactions of the control element on the drive circuit during dynamic state changes are compensated for.

In accordance with an added feature of the invention, the prescribed voltage value to which the charge reversal capacitor is charged when a control element is discharged corresponds to a sum U2=U1+Uz of a voltage U1 on the charge capacitor and a breakdown voltage Uz of a Zener diode connected in series with the charge capacitor.

In accordance with an additional feature of the invention, the control circuit contains a value (either formed in the control circuit or fed to it) for the nominal voltage of each control element, and the charge reversal capacitor is charged, when a previously driven control element is discharged, to a voltage associated with the control element in accordance with the formula U2n=Usn−U1, where n=2. . . x, Usn is the nominal voltage of the respective control element, and U1 is the voltage of the charge capacitor.

With the above and other objects in view there is also provided, in accordance with the invention, an apparatus for performing the above-outline method, i.e., for driving at least one capacitive control element. The apparatus according to the invention comprises:

a charge capacitor connected between a positive pole and a negative pole of a voltage source;

a first series circuit connected in parallel with the charge capacitor, the first series circuit including a charging switch and a discharging switch connected to the negative pole;

a second series circuit connected in parallel with the discharging switch, the second series circuit including a charge reversal capacitor, a charge reversal coil, a first control element, and a first selection switch;

for each further control element, a further series circuit connected in parallel with the first control element and the first selection switch, each the further series circuit respectively including a control element and a selection switch associated with the control element;

a control circuit connected to and controlling all the switches;

wherein the charge capacitor is dimensioned substantially larger than the charge reversal capacitor;

a limiter path connected from a node between the charge reversal capacitor and the charge reversal coil to a node between the charge capacitor and the charging switch, the limiter path comprising a series circuit formed of a diode, which is forward biased in a direction of the charge capacitor, and a limiter switch.

In accordance with another feature of the invention, the limiter switch is turned on as soon as the charge reversal capacitor is charged, when a control element is discharged, to a voltage associated with a next control element to be charged.

In accordance with a further feature of the invention, the limiter path further includes a Zener diode between the diode and the limiter switch in a reverse direction towards the charge capacitor.

In accordance with again a further feature of the invention, the limiter switch is turned on and off synchronously with the discharging switch.

In accordance with a concomitant feature of the invention, the voltage source is a controlled voltage source and an output voltage of the voltage source can be regulated.

The expression "substantially greater" will be understood by those of skill in the art within the technological boundaries. As described herein, it may be understood, by way of example, as one order of magnitude and preferably even two orders of magnitude.

Of particular advantage is the fact that the known circuit need be expanded only by a few components in order to achieve this object, and that the voltage source may be a constant voltage source.

Other features which are considered as characteristic for the invention are set forth in the appended claims.

Although the invention is illustrated and described herein as embodied in a method and apparatus for driving at least one capacitive control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic circuit diagram of a first exemplary embodiment of the invention; and FIG. 2 is a schematic circuit diagram of a second exemplary embodiment.

DESCRIPTION OF THE PREFERRED EMBODIMENTS

Referring now to the figures of the drawing in detail and first, particularly, to FIG. 1 thereof, there is illustrated a first exemplary embodiment on the basis of the invention using an apparatus for driving non-illustrated fuel injection valves in an internal combustion engine by means of piezoelectric control elements Pn (n=1, 2. . . x) using a control circuit ST. The control circuit ST forms a part of a microprocessor-controlled engine control unit, which is not illustrated for reasons of clarity.

Between a positive pole $+U_{SNT}$ and a negative pole GND of a constant voltage source SNT—preferably a switched mode power supply—there is connected a series circuit comprising a first diode D1, which is forward biased from the positive pole, and a charge capacitor C1.

Connected in parallel with the charge capacitor C1 is a series circuit comprising a charging switch Ta, two diodes D2 and D3 which are forward biased away from the latter, and a discharging switch Tb connected to the negative pole GND. The diodes D1 . . . D3 are blocking diodes.

Connected between the junction point of the two diodes D2 and D3 and the negative pole GND is a series circuit comprising the charge reversal capacitor C2, a charge reversal coil L, a first control element P1 and a first selection switch T1.

As already described above, C1>>C2 needs to be chosen (for example C1≅100*C2, with C1=680 $\mu$F and C2=6.8 $\mu$F).

For each further fuel injection valve, a series circuit comprising, respectively, a control element Pn (n=2. . . x) and a selection switch Tn (n=2. . . x) associated with this control element is connected in parallel with the series circuit comprising the first control element P1 and the first power MOSFET switch T1.

A further switch Tc is connected in parallel with the parallel series circuits comprising the control elements and selection switches.

The further switch Tc is driven by the control circuit ST if the control element voltage exceeds a prescribed limit value or if a fault occurring in the internal combustion engine up to the power output stages of the injection valves is detected. In that case the switch Tc discharges the capacitive control elements Pn in the manner of a short via the inverse diodes of the selection switches T1 to Tx. The further switch Tc is also required in order to charge the discharge capacitor C2 before the control element is actuated for the first time or in order to recharge the discharge capacitor between two instances of the control element being actuated which are a long time apart.

Connected between the node K between the charge reversal capacitor C2 and the charge reversal coil L and the node between the charge capacitor C1 and the charging switch Ta is a limiter path BP. The limiter path BP comprises a series circuit made up of a fourth diode D4, which is forward biased in the direction of the charge capacitor C1, a Zener diode Dz which blocks in this direction and a limiter switch Td, which in this exemplary embodiment is turned on and off synchronously with the discharging switch Tb. The diode D4 in the limiter path BP prevents the constant voltage source SNT from being shorted when the discharging switch Tb and the limiter switch Td are closed, i.e. are on. The limiter switch Td prevents a charged control element P1 to Px from discharging via the limiter path into the charge capacitor C1. The Zener voltage Uz of the Zener diode DZ can be chosen such that, even with minimal energy recovery, the voltage U2 is determined by the Zener diode Dz.

All the switches are controlled by a control circuit ST on the basis of control signals st received from a non-illustrated engine control unit.

In this exemplary embodiment, the selection switches Tn (n=1 to x), the discharge switch Tb and the further switch Tc are N-power MOSFET switches, which usually contain inverse diodes. The charging switch Ta and the limiter switch Td are in the form of P power MOSFET switches in this exemplary embodiment.

The text below explains the method used to operate the apparatus illustrated in FIG. 1. With this method, the charge reversal capacitor C2 is intended to be charged only up to a prescribed, constant value U2 when the control element is discharged.

Since the voltage drops across switches and diodes are negligibly small in comparison with the voltages across the charge capacitor, across the charge reversal capacitor, and the Zener diode, they will already be present in the voltages U1 (across the charge capacitor C1), U2 (across the charge reversal capacitor C2), and Uz (breakdown voltage of the Zener diode DZ).

When the apparatus is switched on before the start of operation, the charge capacitor C1 is charged to U1 and the discharge capacitor C2 is in a discharged state and the reversal coil L is in a de-energized state.

Before a control element is actuated for the first time, the full nominal voltage Us needs to be already present on the series circuit comprising C1+C2. With assumed values U1=60 V, Uz=20 V and U2=U1+Uz=80 V in this exemplary embodiment, the following results:

$$Us=U1+U2=2.U1+Uz=140 \text{ V}.$$

So that the capacitor C2 is also charged before the first actuation of the control element, the further switch Tc is first turned on. As a result of this, C1 discharges via C2, L and Tc. Tc is then turned off and the discharging switch Tb is now turned on.

This causes a current to flow in the opposite direction through L, C2, Tb and the inverse diode in the further switch Tc, as a result of which the charge reversal capacitor C2 is charged and polarized such that, after one or more charging and discharging cycles, it has a voltage U2 across it which increases the voltage U1.

In order to actuate a control element (e.g. P1) using a control signal st, the charging switch Ta and the selection switch Tx associated with the corresponding control element (e.g., T1) are turned on. A current flows from the capacitor C1, which is recharged from the voltage source SNT, via Ta, D2, C2, L, P1 and T1 to GND, as a result of which the control element is charged.

Ta and T1 are then turned off. The charge state of the control element P1 is maintained until the discharging switch Tb and, synchronously with the latter, the limiter switch Td are turned on after the control signal st has disappeared. When the discharging switch Tb is on, all the control elements Pn are discharged via the coil L. The discharge current first flows into the charge reversal capacitor C2, and the voltage U2 rises. If the voltage U2—which can be measured at the node point K—exceeds the value U1+Uz=80 V, the excess charge is stored in the charge capacitor C1 via the limiter path BP.

For the case in which the charge reversal capacitor C2 were not sufficiently charged when the control elements were discharged, the voltage source SNT would need to be regulatable in order to be able to recharge the charge capacitor C1 such that U1+U2=Us.

The excess charge is also routed to the charge capacitor C1 via the limiter path, as described above, when the charge reversal capacitor C2 is charged for the first time. In this manner, the capacitor C2 is charged to the voltage U2 (in this exemplary embodiment =80 V) before the first actuation of a control element.

Once the driving operation of a control element has ended, the driving operation of the next control element can take place in the same manner, as just described.

If Uz=0 V is chosen, the Zener diode Dz can be removed from the limiter path, so that it causes no power loss. The result then is U2=U1.

Since the control elements P1 to Px vary among one another, i.e. have different capacitances, but also the dynamic state changes in the internal combustion engine have different stochastic reactions on the individual cylinders, and accordingly the control elements also exert different stochastic reactions on the drive circuit, a second exemplary embodiment of the invention provides for the nominal voltage Usn for each individual control element Pn to be able to be prescribed selectively for the cylinders.

This is achieved by the charge reversal capacitor C2 being charged, when a control element Pn-1, e.g. P1, is discharged, to a voltage U2n which, together with the voltage U1, forms the charge voltage (nominal voltage Usn) for the next control element, e.g. P2. In this case, during the discharging operation for the control element Pn-1, the switch Tb is first turned on and the control element Pn-1 is discharged into the charge reversal capacitor C2 and the voltage U2 dropping between the junction point K and the negative pole GND is measured. If this voltage exceeds the value U2n, which is formed in the control circuit ST or is transmitted to it by the engine control unit, the limiter switch Td is turned on and the residual charge of the control element Pn-1 is routed to the charge capacitor C1, as a result of which the voltage U2=U2n rises no further. Hence, the charge capacitor C1 and the charge reversal capacitor C2 are charged to the aggregate voltage Usn=U1+U2n for the next control element Pn to be driven.

Referring now to FIG. 2, there is shown a circuit for carrying out that method; the circuit essentially corresponds to the circuit shown in FIG. 1. The difference is that the limiter path contains no Zener diode Dz (as in the first exemplary embodiment with Uz=0 V) and that, whenever the discharging switch Tb is on, the voltage U2 is supplied to the control circuit ST, is compared therein with a prescribed value U2n which is associated with the next control element Pn, and the switch Td is turned on, as described above, when U2 reaches or exceeds the prescribed value U2n.

With the method described and the two apparatuses for carrying out this method, the listed reactions of the control elements on the drive circuit during dynamic state changes can easily be compensated for or eliminated—either for all cylinders together or selectively for the cylinders.

We claim:

1. A method of driving at least one capacitive control element with a control circuit, which comprises:

providing a series circuit of a charge capacitor and a charge reversal capacitor, the charge capacitor having a capacitance substantially greater than a capacitance of the charge reversal capacitor;

selectively charging a capacitive control element with a nominal voltage applied to the series circuit of the charge capacitor and the charge reversal capacitor, and discharging the control element into the charge reversal capacitor, and thereby charging the charge reversal capacitor to a prescribed voltage value; and when the charge reversal capacitor has reached the prescribed voltage value, charging a remaining residual charge of the control element into the charge capacitor.

2. The method according to claim 1, wherein the prescribed voltage value to which the charge reversal capacitor is charged when a control element is discharged corresponds to a sum U2=U1+Uz of a voltage U1 on the charge capacitor and a breakdown voltage Uz of a Zener diode connected in series with the charge capacitor.

3. The method according to claim 1, wherein the control circuit contains a value for the nominal voltage of each control element, and the charge reversal capacitor is charged, when a previously driven control element is discharged, to a voltage associated with the control element in accordance with the formula U2n=Usn−U1, where n=2. . . x, Usn is the nominal voltage of the respective control element, and U1 is the voltage of the charge capacitor.

4. The method according to claim 3, wherein the value for the nominal value is formed in or received by the control circuit.

5. The method according to claim 1, wherein the control element is a piezoelectrically operated fuel injection valve in an internal combustion engine.

6. An apparatus for driving at least one capacitive control element, comprising:

a charge capacitor connected between a positive pole and a negative pole of a voltage source;

a first series circuit connected in parallel with said charge capacitor, said first series circuit including a charging switch and a discharging switch connected to the negative pole;

a second series circuit connected in parallel with said discharging switch, said second series circuit including a charge reversal capacitor, a charge reversal coil, a first control element, and a first selection switch;

for each further control element, a further series circuit connected in parallel with said first control element and said first selection switch, each said further series circuit respectively including a control element and a selection switch associated with said control element;

a control circuit connected to and controlling all said switches;

wherein said charge capacitor is dimensioned substantially larger than said charge reversal capacitor;

a limiter path connected from a node between said charge reversal capacitor and said charge reversal coil to a node between said charge capacitor and said charging switch, said limiter path comprising a series circuit formed of a diode, which is forward biased in a direction of said charge capacitor, and a limiter switch.

7. The apparatus according to claim 6, wherein said limiter switch is turned on as soon as said charge reversal capacitor is charged, when a control element is discharged, to a voltage associated with a next control element to be charged.

8. The apparatus according to claim 6, wherein said limiter path further includes a Zener diode between said diode and said limiter switch in a reverse direction towards said charge capacitor.

9. The apparatus according to claim 8, wherein said limiter switch is turned on and off synchronously with said discharging switch.

10. The apparatus according to claim 6, wherein said voltage source is a controlled voltage source and an output voltage of said voltage source can be regulated.

* * * * *